United States Patent
Childress et al.

(10) Patent No.: US 7,490,349 B2
(45) Date of Patent: Feb. 10, 2009

(54) SYSTEM AND METHOD OF ENFORCING HIERARCHICAL MANAGEMENT POLICY

(75) Inventors: Rhonda L. Childress, Austin, TX (US); Alan James Keel, Franklinton, NC (US); David Bruce Kumhyr, Austin, TX (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 11/097,574

(22) Filed: Apr. 1, 2005

(65) Prior Publication Data

US 2006/0225123 A1    Oct. 5, 2006

(51) Int. Cl.
*G06F 21/00* (2006.01)
*G06F 15/80* (2006.01)

(52) U.S. Cl. .......................... 726/6; 726/16
(58) Field of Classification Search .......... 726/6, 726/16
See application file for complete search history.

(56) References Cited

U.S. PATENT DOCUMENTS

2003/0115484 A1   6/2003   Moriconi et al.
2005/0165787 A1*  7/2005   Kaneda et al. ............. 707/10

FOREIGN PATENT DOCUMENTS

CN        1191525 A        3/2005

* cited by examiner

*Primary Examiner*—Gilberto Barron, Jr.
*Assistant Examiner*—Venkat Perungavoor
(74) *Attorney, Agent, or Firm*—Duke W. Yee; Jeffrey S. LaBaw; A. M. Thompson

(57) ABSTRACT

A system and method for using hierarchical policy levels. In one embodiment, computers of the network are arranged into a hierarchy. A management policy server with access to the network queries the network to identify computers at or below its own level within the hierarchy. Computers under the control of the management policy server are identified, and management programs, updates or policies are automatically distributed to the computers, without manual intervention.

3 Claims, 2 Drawing Sheets

SYSTEM AND METHOD OF ENFORCING HIERARCHICAL MANAGEMENT POLICY

BACKGROUND OF THE INVENTION

1. Technical Field

The present invention relates generally to computer systems, and particularly to a system and method for efficiently managing updating of software on computers of a network.

2. Description of Related Art

System management products, such as those that monitor software distribution, or manage security products, security intrusion, and storage area networks, are employed in many organizations. Such products are typically sold at both the enterprise level and department level. For example, high ranking individuals of an organization decide to purchase a system management product for use in the entire enterprise, while departmental decisions may be made at a lower level in the organization.

Thus, management products are sold in several usage types, for example, such products and services can be sold at the individual level, workgroup level, department level, division level, and enterprise level. However, purchasing a product at one level within the organization, for example, at the department level, does not mean that the product is implemented at all levels beneath the department level in the same manner. Nor does it mean that earlier purchased versions of the product are automatically dovetailed with the newly purchased level of the product. For example, though a department server may have a system management product implemented thereon, that system management product will not necessarily be distributed to individual workgroup servers, or to individual workstations of the network.

The reasons for this failure of products to "filter down" from higher organizational levels to lower organizational levels often involve individual preferences of people working within the organization. For example, when humans are required to check for or implement updates or new products, other tasks may be deemed of higher importance, delaying implementation of an update. Alternatively, a human operator may decide that the update is unnecessary or may interfere with other work that is being performed.

Furthermore, individuals do not necessarily have the proper incentive to install new software on their systems. Though upgrading to new software may ultimately improve overall enterprise performance and efficiency, from the perspective of an individual within the enterprise, changing to a new software product can produce an immediate loss of productivity as the individual must learn the new software program. Hence, resistance to implementing new software, even when already paid for and available to an individual in a network, may prevent proper distribution of the software to all machines in a given network or section of a network. Other reasons for delaying an update to the software, including a different configuration or choice of policies chosen by the individual responsible for the enterprise level of the organization as opposed to those already in place at the department level.

Therefore, the present state of the art in systems management would benefit from a system and method for more efficiently implementing changes in software in an enterprise, particularly multilevel system management software.

SUMMARY OF THE INVENTION

The present invention teaches a system and method for efficiently managing distribution and updating of software and policies to computers of a computer network. In one implementation, a data processing system, that has management policy software installed, inventories the computers of a network, such as a LAN. The computers of the network are arranged into a hierarchy. A determination is made as to whether at least one computer in the sets of computers is subject to the management authority of the data processing system, according to the hierarchy. Once it has been determined that the data processing system has management authority over at least one computer in the set of computers, the data processing system manages distribution of software and policies to the computers over which the data processing system has management authority. Higher level policy servers are authorized to establish software policy for computers of lower authority in the hierarchy. These policies can range from merely establishing the existence of the lower level computers on the network to dictating the exact configuration of software loaded onto controlled computers. In preferred embodiments, the policy can deny users configuration options, allow users configuration options, or permit some options but deny others. Further, authorized policy servers can dictate configuration options on preexisting installed programs on computers under their authority.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention teaches a system and method for using policy levels to enforce control over system management products. In one example embodiment, policy levels are set at the individual, workgroup, department, division, and enterprise levels, though any hierarchical division may be used. The policy levels determine control over enforcement of software distribution and management. For example, in one embodiment, a special policy server is attached to the network (for example, a local area network of a business or other organization) and is designated as department level. This special department level policy server includes software for sending and receiving signals to and from individual system tools or programs (such as an anti-virus program). The department level policy server has control over distribution and management of software and updates for all hierarchical divisions lower than itself. In other words, if departments are divided into workgroups and individual stations, then the department level policy server can control distribution and management of software to workgroups and individual stations, assuming control from individuals. The innovative system and method will be described with reference to the several figures.

Figure 1:
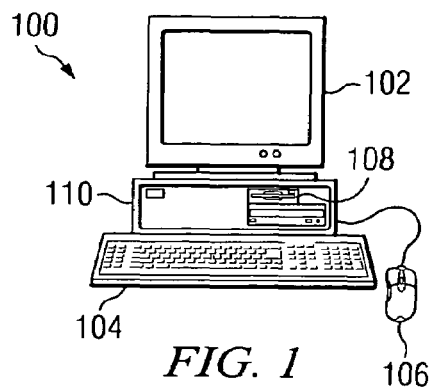
FIG. 1 shows a block diagram of a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
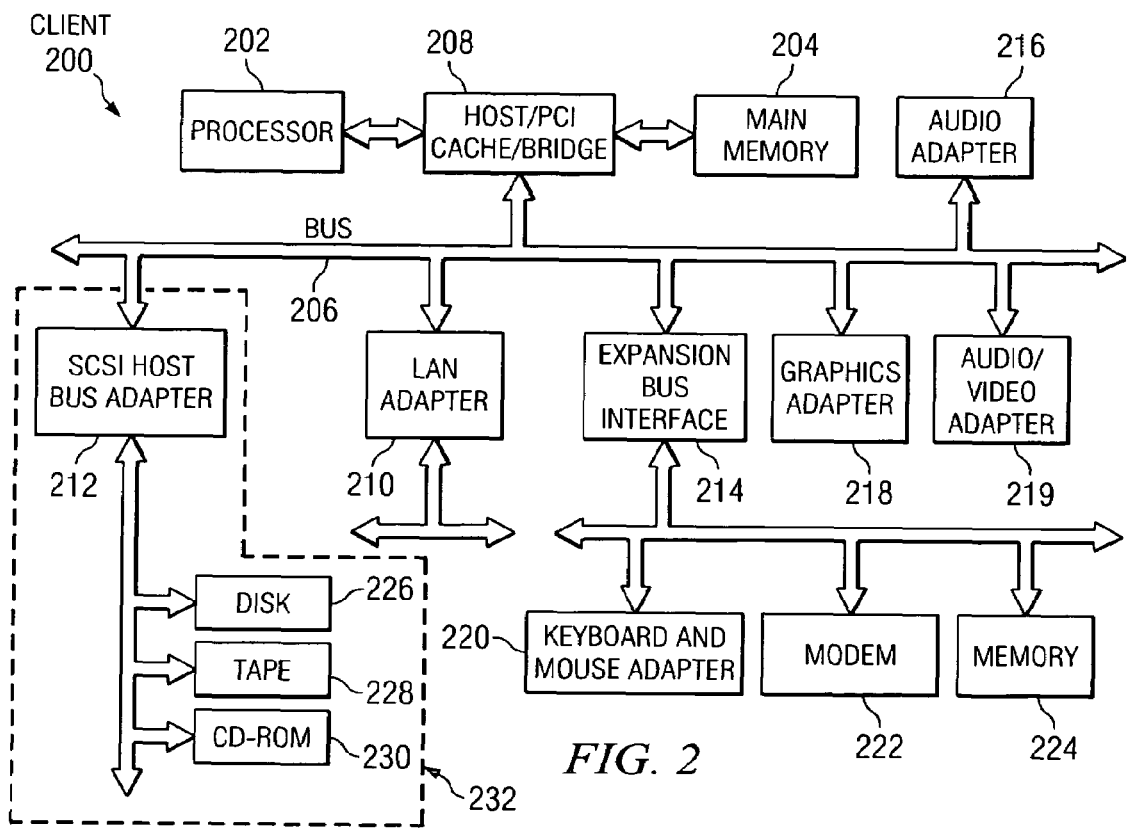
FIG. 2 shows a diagram of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
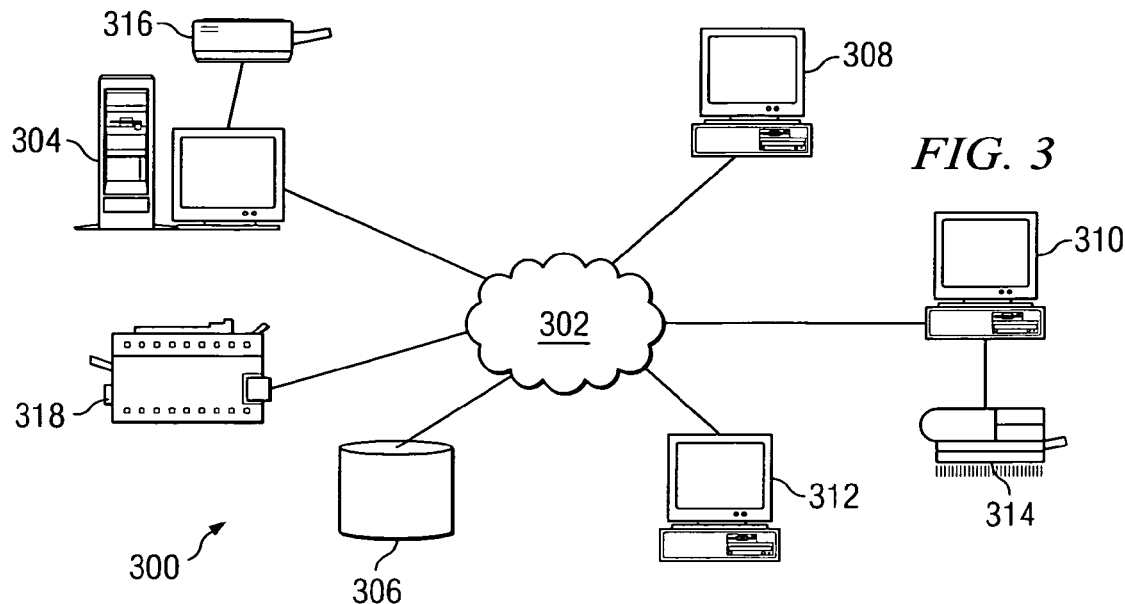
FIG. 3 shows a computer network consistent with implementing a preferred embodiment of the present invention.

With reference now to the figures, FIG. 3 depicts a pictorial representation of a network of data processing systems in which the present invention may be implemented. Network data processing system 300 is a network of computers in which the present invention may be implemented. Network data processing system 300 contains a network 302, which is the medium used to provide communications links between various devices and computers connected together within network data processing system 300. Network 302 may include connections, such as wire, wireless communication links, or fiber optic cables.

In the depicted example, a server 304 is connected to network 302 along with storage unit 306. In addition, clients 308, 310, and 312 also are connected to network 302. These clients 308, 310, and 312 may be, for example, personal computers or network computers. In the depicted example, server 304 provides data, such as boot files, operating system images, and applications to clients 308-312. Clients 308, 310, and 312 are clients to server 304. Network data processing system 300 includes printers 314, 316, and 318, and may also include additional servers, clients, and other devices not shown.

In the depicted example, network data processing system 300 is, for example, a local area network with network 302 representing a collection of networks and gateways that use the TCP/IP suite of protocols, or another system of protocols, to communicate with one another. Of course, network data processing system 300 also may be implemented as a number of different types of networks, such as for example, an intranet, a local area network (LAN), or a wide area network (WAN). FIG. 3 is intended as an example, and not as an architectural limitation for the present invention.

Figure 4:
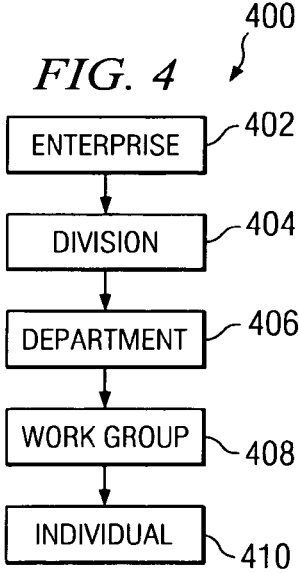
FIG. 4 shows a hierarchical arrangement of computer systems of a network, consistent with implementing a preferred embodiment of the present invention.

In a preferred embodiment, the present invention teaches in part that a hierarchy for software management policy is implemented. An example embodiment of such a hierarchy is shown in FIG. 4. Hierarchy 400 includes, in this example, enterprise level 402, division level 404, department level 406, work group level 408, and individual or workstation level 410. In preferred embodiments, these levels in the hierarchy can have one or more subdivisions. For example, at the division level 404, there can be more than one division. Likewise with the department level 406, as well as other levels described in this example. In preferred embodiments, a special policy server is attached to the network with software for sending and receiving control signals to and from elements located on lower hierarchical levels in hierarchy 400, as described further below.

Figure 5:
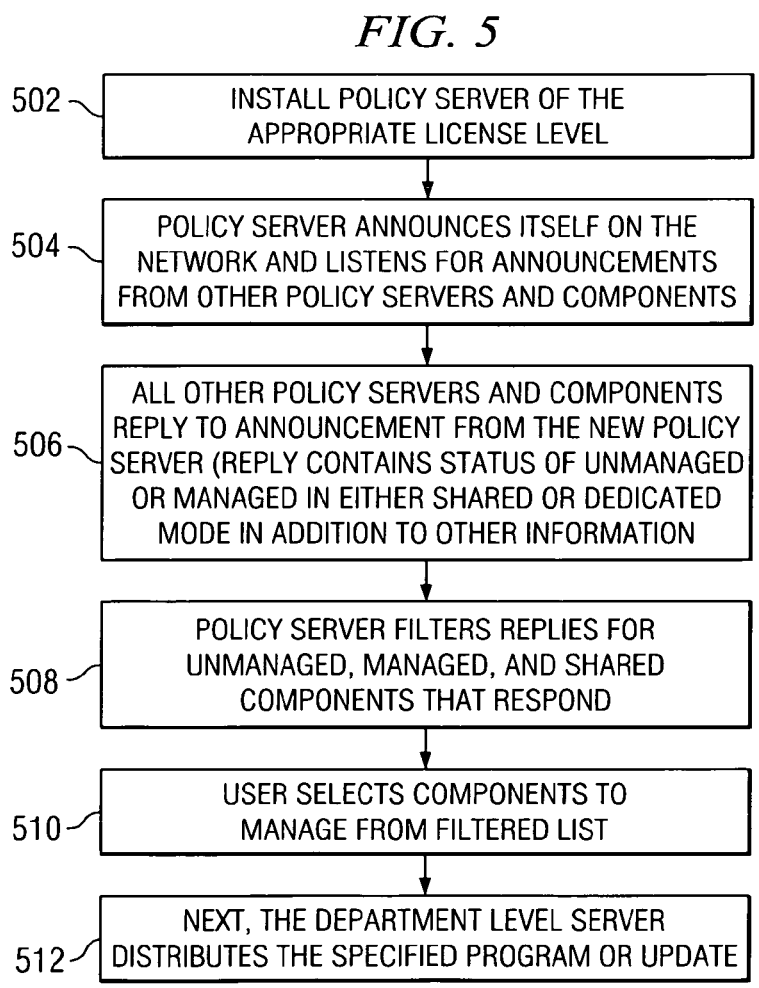
FIG. 5 shows a process flow for implementing a preferred embodiment of the present invention.

In a preferred embodiment, the present invention is implemented as software on a dedicated management policy server which has access to the relevant network, or as software on an existing machine of the network. FIG. 5 depicts an example set of steps for implementing the present innovations.

In this example implementation, the process begins with the installation of a policy server of the appropriate license level (step 502). This includes management policy software (preferably located on a dedicated server—the policy server—attached to a network). The policy server announces itself on the network and listens for announcements from other policy servers and components (step 504). This is preferably done by sending out a broadcast signal to other servers and/or workstations attached to the network. There are many mechanisms for broadcasting the signal such as through an internet or intranet logon procedure, e-mail, wireless communication using various protocols, such as Bluetooth, EDI band networks, etc. For purposes of this example, we assume the management policy software or server is department level 406 with reference to the hierarchy of FIG. 4, though it could be of any hierarchical level or subdivision. In a one embodiment, the broadcast signal is transmitted to all computers of the network, while in other embodiments, the signal is broadcast only to those computers equal at or below the hierarchical level of the broadcasting server. In still other implementations, only those computers below the hierarchical level of the broadcaster receive the signal. Preferably, the broadcast includes a request for response from the receiving computers, including the version of the type of software about to be distributed that already resides on the responding computer. There is no problem of flooding the network with broadcast as the broadcast can be set to occur periodically, at any interval the user wishes. For example the interval could be hourly, daily, weekly, monthly or every thirty minutes, etc.

In a first embodiment, all other policy servers and components reply to announcement from the policy server (step 506). Preferably, the reply contains status of "unmanaged" or "managed" in either "shared" or "dedicated" mode in addition to other information, which gives the department level policy server a list of all available machines under the management of that server. A "managed" component is under the authority and thus under the management of the policy server querying the component, while an "unmanaged" component is not subject to such control. A "dedicated" component is one that can be only managed by a single policy server. A "shared" component is one that can be managed by more than one policy server. In a preferred embodiment, the reply also includes the version of the software that the responding computer currently has. Also in a preferred embodiment, with reference to FIG. 4, this would include all workgroup servers and workstations, as well as individual servers and workstations.

In another embodiment, responsive to determination of an absence of any version of the software on the responding computer, the invention selectively initiates installation of the absent software. Depending on the implementation, code may exist to intitate installation of mission software. In other cases, a user, such as the system administrator may be notified that the software needs to be installed.

In another embodiment, only servers respond to the signal, and act as distribution nodes to workstations accessing the network through that server. Policy servers also filter the replies for unmanaged, managed, and shared components that respond to determine whether those components are under the authority of the policy server (step 508) and then sends the filtered response to the newly installed policy server.

In some instances, components to be managed by the policy server may have third party management software installed on them. In such a case, the policy server would need an adapter to communicate with the third party software. The adapter is a computer program product that facilitates the communication between the third party software and the policy server by translating the instructions from one unit to the other. In this manner the policy server can then mange software on components that do not have the management policy software. This also allows the policy server to manage the third party software as well.

A user then selects components to manage from filtered list (step 510), or preset components can be chosen for management. In preferred embodiments, the new policy server determines the level of configurability left available to policy servers and components of lower authority in the network. For example, the new policy server may merely identify those components under its control, but allow them to configure their software on their own, and update as they see fit. Alternatively, the new policy server may dictate some or all configuration options for managed components, and may also mandate the updates and software versions to be loaded onto that component. Also in preferred embodiments, note that a policy server of a given level in the hierarchy, for example, a department level policy server, cannot manage components under the control of a higher level policy server in the hierarchy. In other words, a department level policy server cannot manage a component that is already managed by a division level policy server or an enterprise level policy server, as those components are managed by a higher level policy server.

Next, the department level server distributes the specified program or update (step 512), either to workgroup servers which then distribute the program or update to individual workstations, or to both servers and workstations alike. The managing policy server can also distribute new policies or configuration rules to the managed computers, as well as software updates.

Note that though the above process flow is described with respect to a department level policy server, the process steps are applicable to other policy servers of different authorities (e.g., workgroup level, division level or enterprise level servers, for example).

Also note that though the above process flow is described with respect to a newly installed policy server, the process steps are applicable to policy servers that are already installed. That is, the steps also describe the process of distributing software or policy updates by policy servers that have previously been installed.

In a preferred embodiment, the management products themselves (e.g., antivirus software programs, firewalls, or other software programs of the network) are equipped to detect the broadcast signal from, in the above example, the department level management policy server. The modified program is equipped to reply to the signal, preferably including relevant information in the reply, such as the date of last updating of the software, the version, and available resources for adding new or different software to that computer system. In another embodiment, a separate program resides on computers of the network that watches for the broadcast signal and gathers the necessary information for the response.

In a preferred embodiment, the individual policy servers and components listen to a dedicated port or socket of the network for the broadcast and responses discussed above. By these communications, the policy servers and components announce themselves, discover each other, and receive control (in the case of authorized policy servers). The communication of such components can be implemented in a way similar to how network routers discover each other. For example, protocols such as EGP (Edge Gateway Protocol), BGP (Border Gateway Protocol) and IGP (Interior Gateway Protocol), are built on top of the TCP/IP protocol and are known means for the communication between components. Such protocols can be used to implement preferred embodiments of the present invention.

As mentioned above, various updates, configuration options and policies can be managed under the present invention, centralizing control of these functions into policy servers. Examples of types of policies and updates that can be managed include, but is not limited to, software configurations and updates, access policies, security policies, bandwidth allocation, internet access, and e-mail policies such spam policies. The policy servers themselves are arranged into the aforementioned hierarchical authority scheme, so that policy servers preferably can only manage those components beneath them in the hierarchy, not peers or those above them in the hierarchy. Thus, a workgroup level server cannot manage components managed by a department level or higher level policy server. This permits efficient adoption of software and configurations by sections of an organization or system of networked computers. For example, if a given update is to be adopted across an entire enterprise, an enterprise level policy server is used to manage distribution of the update, since it has management authority for all computers of the system. Likewise, if only a particular department need adopt a particular update, then only a department level policy server need be used to distribute the update.

Security issues that arise from such arrangement and assignment of authority include the possibility that by accessing a network as a policy server having high level management authority, that policy server will be able to manipulate updates and configuration of an array of computers within the network. In other words, once establishing oneself as an authorized policy server on the network, one would have authority to modify and significantly control many components of the network. Though such security concerns are serious, implementing solutions to those concerns is not trivial, and addressing them is beyond the scope of this invention. One solution would be a human engineering type of solution that a certain level of policy server would need to be approved at the CIO level of a different company. Other possible solutions include self authentication by use of digital signatures and use of third party certificates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable media, such as a floppy disk, a hard disk drive, a RAM, CD-ROMs, DVD-ROMs, and transmission media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for controlling a distribution of a system management product in a computer network, comprising:

broadcasting a request from a policy server at a specified policy level to a set of computers in the computer network, the set of computers being arranged in a hierarchy, the request being sent to each computer in the set of computers at an equal or lower level of the hierarchy, the policy server including management policy software, wherein the specified policy level controls a distribution of the management policy software;

determining whether each computer in the set of computers arranged in the hierarchy is subject to a management authority of the policy server at the specified policy level;

receiving a reply from a computer in the set of computers, the reply comprising a status information that indicates whether the computer in the set of computers is subject to the management authority of the policy server, information about a software version of the system management product on the computer, and date information providing a previous update of the system management product, wherein the status information is selected from the group consisting of managed and unmanaged in one of a shared and dedicated mode, wherein a status information of managed indicates that the computer is subject to the management authority, and wherein a status information of unmanaged indicates that the computer is not subject to the management authority, wherein a dedicated mode indicates the presence of a single management authority, and wherein a shared mode indicates the presence of more than one management authority; and responsive to a determination that the computer in the set of computers is subject to the management authority of the policy server, distributing the system management product based on the specified policy level of the policy server, wherein the distributing comprises installing the software management product responsive to an absence of the software version information on the computer, updating software on the computer, and distributing new policies to the computer.

2. A computer program product including a computer recordable medium tangibly embodying executable instructions for controlling a distribution of a system management product in a computer network, the computer program product comprising:

first executable instructions broadcasting a request from a policy server at a specified policy level to a set of computers in the computer network, the set of computers being arranged in a hierarchy, the request being sent to each computer in the set of computers at an equal or lower level of the hierarchy the policy server including management policy software, wherein the specified policy level controls a distribution of the management policy software;

second executable instructions determining whether each computer in the set of computers arranged in the hierarchy is subject to a management authority of the policy server at the specified policy level;

third executable instructions receiving a reply from a computer, the reply comprising a status information that indicates whether the computer in the set of computers is subject to the management authority of the policy server, information about a software version of the system management product on the computer, and date information of a previous update of the system management product, wherein the status information is selected from the group consisting of managed and unmanaged in one of a shared and dedicated mode, wherein a status information of managed indicates that the computer is subject to the management authority, and wherein a status information of unmanaged indicates that the computer is not subject to the management authority, wherein a dedicated mode indicates the presence of a single management authority, and wherein a shared mode indicates the presence of more than one management authority; and fourth executable instructions, responsive to a determination that the computer in the set of computers is subject to the management authority of the policy server, distributing the system management product based on the specified policy level of the policy server, wherein the distributing comprises installing the software management product responsive to an absence of the software version information on the computer, updating software on the computer, and distributing new policies to the computer.

3. A data processing system for controlling a distribution of a system management product in a computer network, comprising:

a plurality of policy servers, each one of the plurality of policy servers being arranged in a hierarchy at a specified policy level, and including management policy software wherein the specified policy level controls a distribution of the management policy software;

a set of computers communicating with the plurality of policy servers across the network, the set of computers being arranged in the hierarchy and being communicatively coupled to the plurality of policy servers;

a first policy server of the plurality of policy servers at a first policy level, the first policy server including a broadcasting mechanism that broadcasts a request to the set of computers in the computer network based on the first policy level, the first policy server enabled to receive a response from the set of computers;

a determining mechanism that, based on the response, determines whether at least one computer in the set of computers arranged in the hierarchy is subject to a management authority of the first policy server at the specified policy level, the response containing status information selected from the group consisting of managed and unmanaged in one of a shared and dedicated mode, and information about a software version of the system management product on the computer, and a date of a previous update of the system management product, wherein a status information of managed indicates that the computer is subject to the management authority, and wherein a status information of unmanaged indicates that the computer is not subject to the management authority, wherein a dedicated mode indicates the presence of a single management authority, and wherein a shared mode indicates the presence of more than one management authority; and a managing mechanism that, responsive to a determination that the at least one computer in the set of computers is subject to the management authority of the first policy server, distributes the system management product based on the first policy level, wherein the distributing comprises installing the software management product responsive to an absence of the software version information on the computer, updating software on the computer, and distributing new policies to the computer.

* * * * *